US006915125B2

(12) United States Patent
Kuita

(10) Patent No.: US 6,915,125 B2
(45) Date of Patent: Jul. 5, 2005

(54) PORTABLE COMMUNICATION DEVICE HAVING FUNCTION OF AUTOMATICALLY REGISTERING A CALLER'S IDENTIFICATION DATA SIGNAL

(75) Inventor: Takehiko Kuita, Tokyo (JP)

(73) Assignee: NEC Corporation, Tokyo (JP)

( * ) Notice: Subject to any disclaimer, the term of this patent is extended or adjusted under 35 U.S.C. 154(b) by 428 days.

(21) Appl. No.: 09/971,188

(22) Filed: Oct. 5, 2001

(65) Prior Publication Data

US 2003/0139171 A1 Jul. 24, 2003

(30) Foreign Application Priority Data

Oct. 6, 2000 (JP) ....................................... 2000-307536

(51) Int. Cl.[7] ................................................ H04M 1/66

(52) U.S. Cl. .................. 455/411; 455/415; 379/142.04; 709/207

(58) Field of Search ................................ 455/517–518, 455/550.1, 415, 414.1, 411; 379/142.04, 88.19; 713/200–201; 709/206–207, 204

(56) References Cited

U.S. PATENT DOCUMENTS

| | | | | | |
|---|---|---|---|---|---|
| 4,796,291 | A | * | 1/1989 | Makino | 455/415 |
| 5,263,084 | A | * | 11/1993 | Chaput et al. | 379/215.01 |
| 5,627,936 | A | * | 5/1997 | Prasad et al. | 386/96 |
| 5,659,602 | A | * | 8/1997 | Gay | 379/142.01 |
| 5,859,903 | A | * | 1/1999 | Lee | 379/157 |
| 6,041,230 | A | * | 3/2000 | Siira | 455/422.1 |
| 6,061,440 | A | * | 5/2000 | Delaney et al. | 379/202.01 |
| 6,125,286 | A | * | 9/2000 | Jahagirdar et al. | 455/566 |
| 6,151,333 | A | * | 11/2000 | Arimilli et al. | 370/468 |
| 6,253,075 | B1 | * | 6/2001 | Beghtol et al. | 455/415 |
| 6,278,862 | B1 | * | 8/2001 | Henderson | 340/7.2 |
| 6,298,128 | B1 | * | 10/2001 | Ramey et al. | 379/142.01 |
| 2003/0040302 | A1 | * | 2/2003 | Okada | 455/414 |

FOREIGN PATENT DOCUMENTS

| | | |
|---|---|---|
| EP | 0 494 525 | 7/1992 |
| JP | 4-348651 | 12/1992 |
| JP | 6-205096 | 7/1994 |
| JP | 7-15549 | 1/1995 |
| JP | 10-326397 | 12/1998 |
| JP | 11-46163 | 2/1999 |
| JP | 1112636 | 4/1999 |
| JP | 2000-165547 | 6/2000 |
| JP | 2000-201375 | 7/2000 |
| WO | WO 00/35167 | 6/2000 |

OTHER PUBLICATIONS

European Search Report in corresponding application.

* cited by examiner

*Primary Examiner*—Sonny Trinh
*Assistant Examiner*—Marcos Torres
(74) *Attorney, Agent, or Firm*—Whitham, Curtis & Christofferson, PC

(57) ABSTRACT

In a portable communication device, such as a cellular phone, an identification data signal which includes both a directory number and a mail number of the other party is automatically registered in a memory of the portable communication device during a pause period in conversation. Both a bearer's directory number and mail address are automatically also transmitted to the other party during the pause period. This dispenses with manual complex operation for registering the directory number and the mail address in each portable communication device.

12 Claims, 7 Drawing Sheets

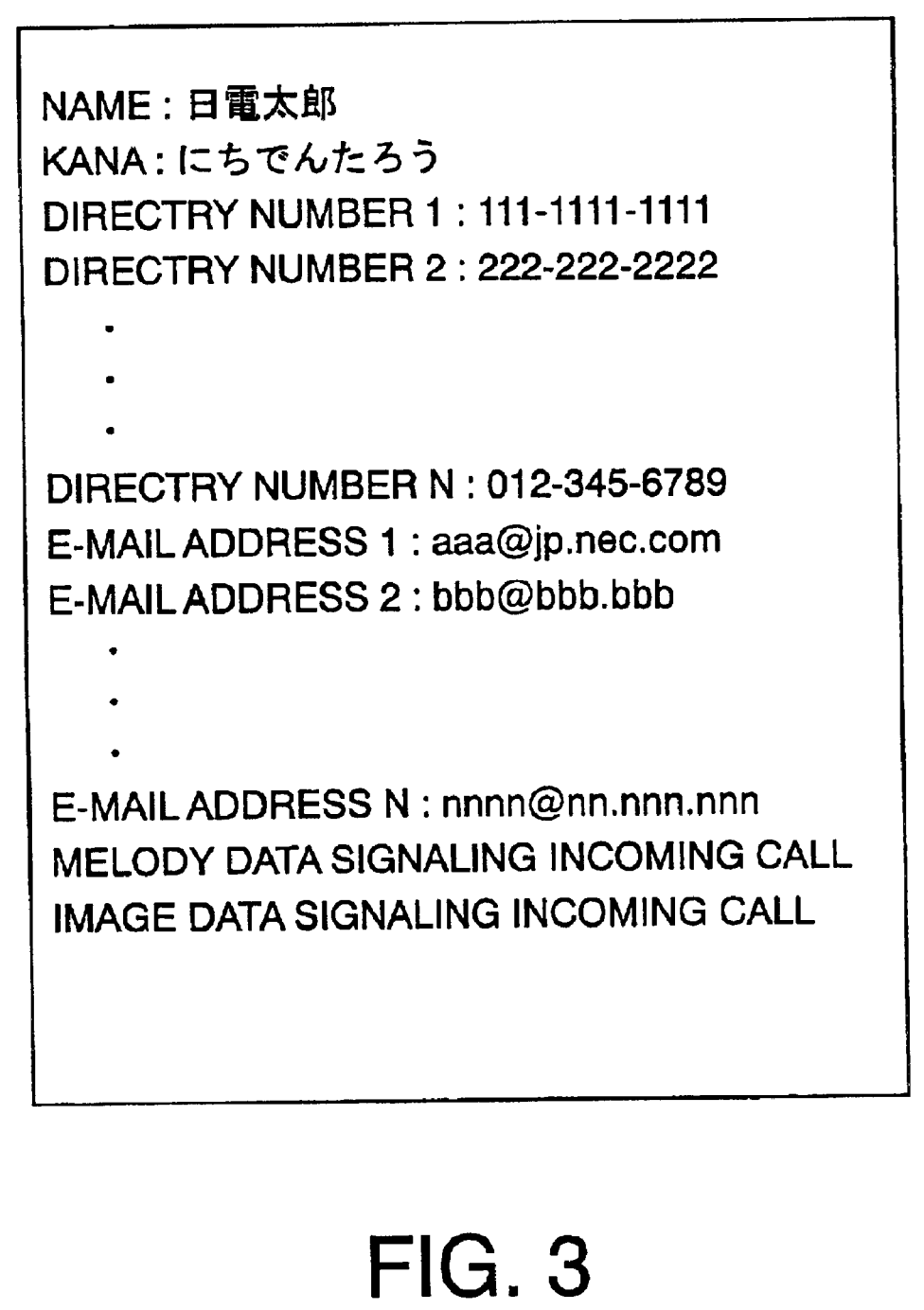

NAME : 日電太郎
KANA : にちでんたろう
DIRECTRY NUMBER 1 : 111-1111-1111
DIRECTRY NUMBER 2 : 222-222-2222
·
·
·
DIRECTRY NUMBER N : 012-345-6789
E-MAIL ADDRESS 1 : aaa@jp.nec.com
E-MAIL ADDRESS 2 : bbb@bbb.bbb
·
·
·
E-MAIL ADDRESS N : nnnn@nn.nnn.nnn
MELODY DATA SIGNALING INCOMING CALL
IMAGE DATA SIGNALING INCOMING CALL

FIG. 3

| R 4 | P 2 | TCH (FACCH) 112 | SW 20 | CC 8 | SF 1 | SACCH /RCH 15 | TCH (FACCH) 112 | G 6 |
|---|---|---|---|---|---|---|---|---|

FIG. 4A

| R 4 | P 2 | TCH (FACCH) 112 | SW 20 | CC 8 | SF 1 | SACCH /RCH 21 | TCH (FACCH) 112 |
|---|---|---|---|---|---|---|---|

FIG. 4B

| ELEMENT | LENGTH (OCTET) |
| --- | --- |
| PROTOCOL IDENTIFIER | 1 (FIXED) |
| CALL NUMBER/ADDITIONAL SERVICE IDENTIFIER | 1 (FIXED) |
| MESSAGE SPECIES | 1 (FIXED) |
| USER·USER | 2～131 (VARIABLE) |
| MORE DATA | 1 (FIXED) |

FIG. 5

PORTABLE COMMUNICATION DEVICE HAVING FUNCTION OF AUTOMATICALLY REGISTERING A CALLER'S IDENTIFICATION DATA SIGNAL

BACKGROUND OF THE INVENTION

This invention relates to a portable communication device, such as a cellular phone, a portable digital assistance (PDA) device, and, in particular, to the cellular phone which can transmit or receive a voice signal through a radio channel.

Heretofore, a wide variety of cellular phones have been manufactured and sold which may be classified into comparatively old-fashioned cellular phones and modern ones. The old-fashioned cellular phones have only a function of talking to another subscriber or a called person in a voice through a radio channel and, in this connection, may register phone or directory numbers of called person or persons alone in a memory.

On the other hand, modern cellular phones can usually have personal e-mail addresses and can practically transfer e-mails by the use of the mail addresses when users make contracts with service providers. Under the circumstances, each modern cellular phone can generally register not only directory numbers but also e-mail addresses assigned to each user and called persons in its memory. In consequence, an amount of data registered in each cellular phone tends to increase more and more with time.

As to such a technology related to a cellular phone, disclosure has been made, for example, in Japanese Unexamined Patent Publications (JP-A) Nos. Hei 6-205096 (namely, 205096/1994; Reference 1), Hei 7-15549 (namely, 15549/1995; Reference 2), Hei 10-326397 (namely, 326397/1998; Reference 3), Hei 11-46163 (namely, 46163/1999; Reference 4), and 2000-165574 (Reference 5). Herein, References 1 through 5 are titled "A telephone set having a function of automatically registering a directory number", "A communication terminal", "An emergency telephone device with a function of memorizing a reporting history", "A digital cellular phone device", and "A facsimile device having a message recording function executed by directory number information", respectively.

However, a teaching of each of References 1 to 5 is made neither about a cellular phone nor about registering both a directory number and e-mail address in the cellular phone. For example, although Reference 4 discloses a cellular digital phone which enables data communication in the absence of a voice signal, consideration is given neither to registering received directory numbers nor to registering e-mail addresses.

Under the circumstances, when a directory number is received from the other party by a cellular phone through the use of a calling line identification presentation service, the cellular phone requires manual operation so as to register or input the directory number each time on reception of the directory number.

On the other hand, when e-mail is received from the other party by such a cellular phone, the e-mail address of the other party is generally attached to the received e-mail. Therefore, it is possible to register a received e-mail address at the user's cellular phone once the e-mail is received from the other party. However, a user of the cellular phone must carry out a manual operation so as to register the other party's e-mail address.

In addition, it is a recent trend that each user has a plurality of directory numbers and a plurality of e-mail addresses as cellular phones and the Internet become popular. However, no consideration at all is given to registering the plurality of directory numbers and e-mail addresses in the cellular phone. This applies to a portable digital assistance (PDA) device also.

SUMMARY OF THE INVENTION

It is an object of this invention to provide a portable communication device which is capable of registering both a directory number and an e-mail address of the other party device once communication is carried out with the opposed party device.

It is another object of this invention to provide a portable communication device of the type described, which is capable of automatically transmitting both a directory number and e-mail address of a user once communication is established.

A portable communication device to which this invention is applicable is for use in carrying out communication with the other party through a radio channel. According to an aspect of this invention, the device comprises a receiver unit for receiving a reception communication signal together with an identification data signal identifying the other party and a first registration section for automatically registering the identification data signal by distinguishing the identification data signal from the reception communication data signal.

According to another aspect of this invention, the portable communication device further comprises a control section for controlling the receiver unit and the first registration section to distinguish between the reception communication data signal and the identification data signal to selectively store only the identification data signal in the first registration section.

The identification data signal is arranged within a pause period of the reception communication data signal. In this event, the control section comprises a detection unit for detecting the identification data signal by monitoring the pause period of the reception communication data signal and a delivery unit for delivering the identification data signal detected by the detection unit to store the same into the first registration section.

According to still another aspect of this invention, the portable communication device further comprises a second registration section for registering a user's identification data signal identifying a user and a transmitter unit for automatically transmitting the user's data signal.

According to yet another aspect of this invention, a portable communication device further comprises a voice signal detection unit for detecting a voice signal to send the voice signal detected to the transmitter unit.

According to another aspect of this invention, the voice signal detection unit comprises a pause detecting section for detecting a pause period from the voice signal to produce a pause detection signal representative of the pause period when the voice signal is absent during the communication. In this case, the first control section further comprises a transmission data selection unit for arranging the user's identification data signal instead of the voice signal when the pause period is detected.

The portable communication device mentioned above may be a portable digital assistance (PDA) device or a cellular phone.

When the portable communication device is a cellular phone, the cellular phone further comprises comparing means for comparing the caller's identification data signal with registered personal identification data signals in the first control section, to detect whether or not the identification data signal is coincident with either one of the registered personal identification data signals and registering means for updating the registered personal identification data signals by delivering the identification data signal to the first registration section only when the identification data signal is incoincident with each of the registered personal identification data signals.

In addition, the cellular phone has a memory for registering the identification data signal which includes both a directory number and e-mail address all of which are assigned to the other party.

The cellular phone further comprises receiving means for receiving a user's voice signal to detect a pause period within the user's voice signal and to produce a pause detection signal representative of the pause period, registering means for registering user's identification data signal, and processing means for processing the user's voice signal and the pause detecting signal to insert the user's identification data signal into the user's voice signal within the pause detection signal.

In this case, each of the identification data signal and the user's identification data signals is separately arranged in place of the voice signal within a traffic channel field.

BRIEF DESCRIPTION OF THE DRAWING

FIG. 3 exemplifies a personal data sequence registered in the cellular phone illustrated in FIG. 1;

FIGS. 4A and 4B shows signal formats used in upward and downward links in a radio section interface;

FIG. 5 shows a format of a user information message in the radio section interface described in conjunction with FIGS. 4A and 4B;

DESCRIPTION OF THE PREFERRED EMBODIMENTS

Figure 1:
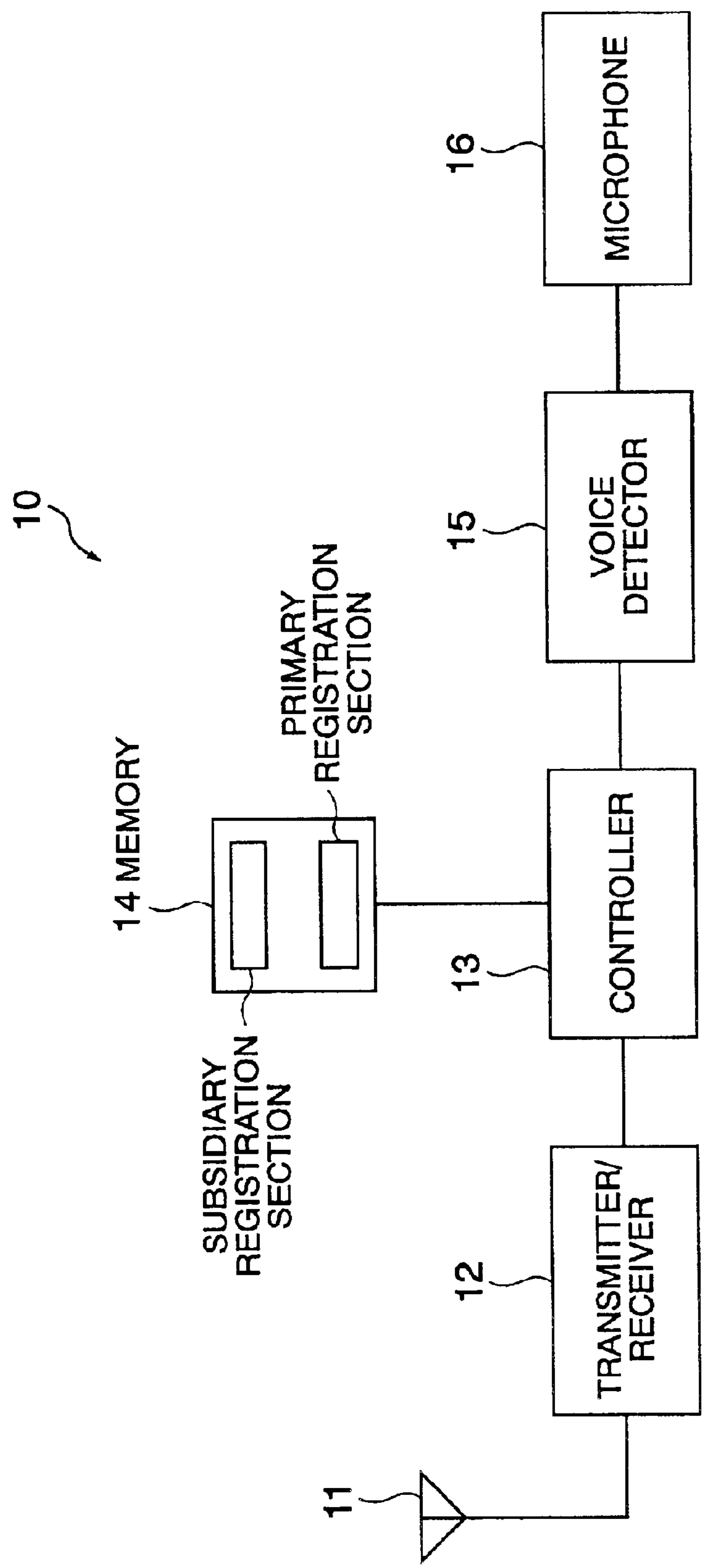
FIG. 1 shows a block diagram for use in diagrammatically describing a cellular phone according to an embodiment of this invention.

Referring to FIG. 1, description will be made about a portable communication device according to an embodiment of this invention. In FIG. 1, a cellular phone is exemplified as the portable communication device, although this invention is also applicable to a portable digital assistance (PDA) device. In any event, the illustrated cellular phone has an antenna 11, a transmitter/receiver 12, a controller 13, a memory 14, an audio or a voice detector 15, and a microphone 16. The microphone 16 is connected to the voice detector 15, as shown in FIG. 1.

Figure 2:
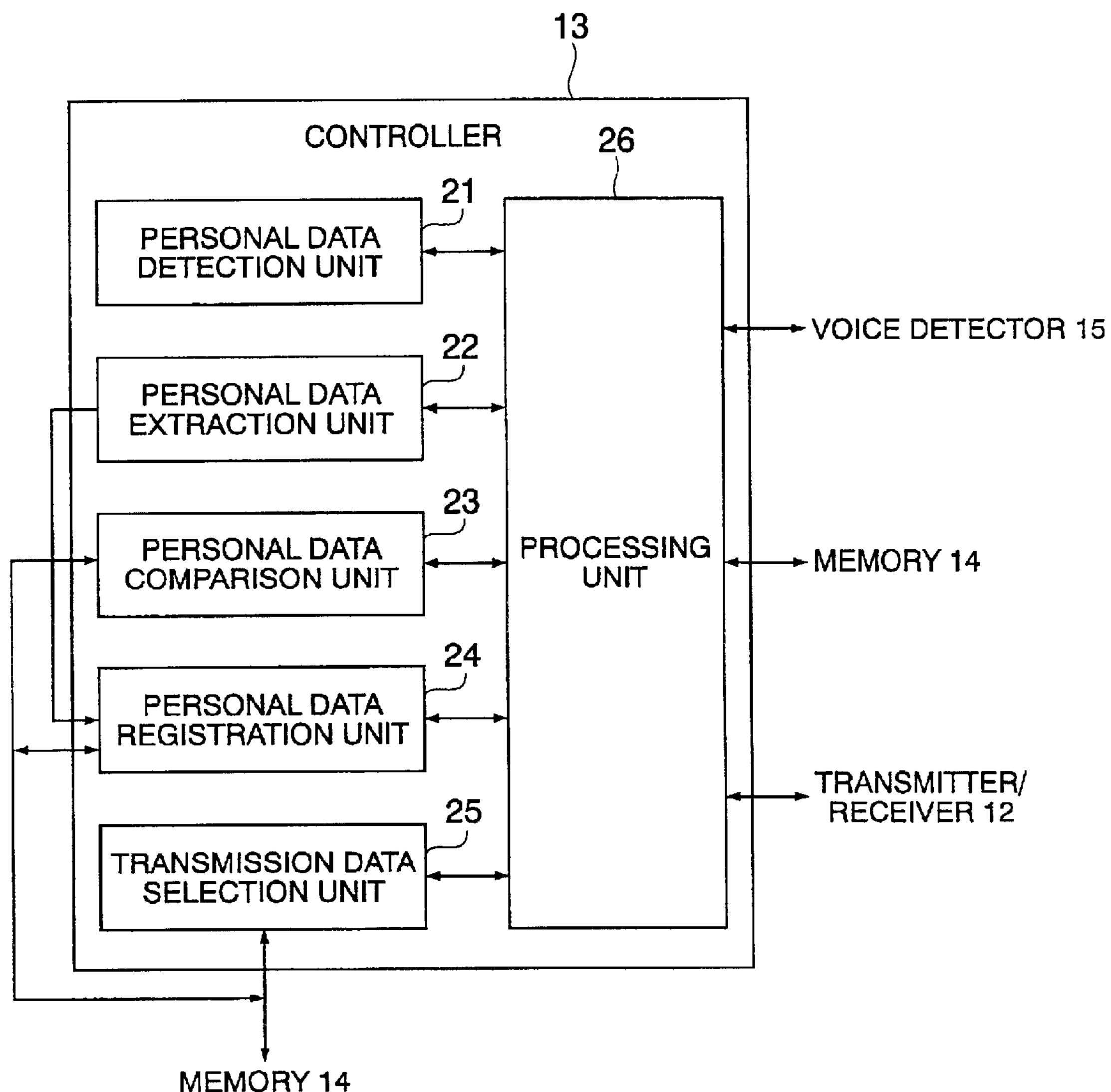
FIG. 2 shows a block diagram for use in describing a controller illustrated in FIG. 1.

Referring to FIG. 2, the controller 13 which is used in the cellular phone illustrated in FIG. 1 may be preferably formed by a CPU. The controller 13 is conceptually divided into a personal data detection unit 21, a personal data extraction unit 22, a personal data comparison unit 23, a personal data registration unit 24, and a transmission data selection unit 25. All of the above-mentioned units 21 to 25 are managed or controlled by a processing unit 26 in a manner to be described later. As shown in FIG. 2, the processing unit 26 is coupled to the voice detector 15 and the transmitter/receiver 12 both of which are illustrated in FIG. 1.

Referring to FIGS. 1 and 2, operations of the cellular phone 10 will be described about each of elements and units illustrated in FIGS. 1 and 2. A sequence of radio data is received or transmitted through the antenna 11 from the other party (not shown). The transmitter/receiver 12 is operable to carry out reception processing of the radio data sequence received through the antenna 11 from another person or the other party and to send a reception data sequence to the controller 13. The transmitter/receiver 12 also executes transmission processing of a sequence of transmission data sent from the controller 13 to send a sequence of radio data through the antenna 11.

The illustrated voice detector 15 serves to detect presence or absence of a voice or speech signal, namely, to detect a speech period or a pause period of the voice signal. When the pause period is detected in the voice signal, the voice detector 15 produces a pause detection signal representative of absence of the voice signal. On the other hand, the voice detector 15 supplies the voice signal to the controller 13, as long as the voice signal of the user is given from the microphone 16 and is detected by the voice detector 15.

Responsive to the pause detection signal, the processing unit 26 of the controller 13 accesses the transmission data selection unit 25 to read a sequence of transmission data out of the memory 14. In this event, a personal data sequence is read out of the memory 14 as the transmission data sequence in the absence of the voice signal and is sent to the transmitter/receiver 12 during the absence of the voice signal. The personal data sequence includes a personal directory number, a personal e-mail address, and the like of a possessor or user of the cellular phone 10. In the illustrated example, the illustrated memory 14 has a primary registration section for registering the user's personal data sequence, such as the personal directory number, the personal e-mail address.

Thus, the personal directory number and the like are automatically transmitted from the illustrated cellular phone 10 as the transmission data sequence in the absence of the voice signal. On the other hand, the processing unit 26 illustrated in FIG. 2 sends the voice signal to the transmitter/receiver 12 through the processing unit 26 in the presence of the voice signal in a known manner.

Supplied with a sequence of reception data from the transmitter/receiver 12 from the other party, the processing unit 26 puts the personal data detection unit 21 into operation to detect whether or not a personal data sequence is included in the reception data sequence. When the personal data sequence is detected from the reception data sequence by the processing unit 26, the processing unit 26 puts the personal data extraction unit 22 into operation to extract the personal data sequence from the reception data sequence sent from the other party. From this fact, it is readily understood that the personal data sequence is representative of the other party's directory number and the like received by the cellular phone 10 when the other party's cellular phone may be similar in structure to that illustrated in FIG. 1 in the example.

The personal data sequence extracted by the personal data extraction unit 22 is sent to the personal data comparison unit 23 under control of the processing unit 26. In this event, the personal data comparison unit 23 is given a sequence of registered data from the memory 14 under control of the processing unit 26. In FIG. 1, such a registered data sequence is stored in a subsidiary memory section of the memory 14 in a manner to be described later.

The personal data comparison unit 23 compares the registered data sequence with the extracted personal data sequence extracted by the personal data extraction unit 22. In the illustrated example, the personal data comparison unit 23 judges whether or not the extracted personal data sequence is previously stored in the memory 14 and whether or not a previously stored data sequence in the memory 14 is to be updated, if the extracted personal data sequence has been previously stored in the memory 14.

When the personal data comparison unit 23 detects that the extracted personal data sequence has been previously stored or is to be updated, the personal data registration unit 24 is operated by the processing unit 26 to store the extracted personal data sequence into the memory 14. Thus, the extracted personal data sequence is written or registered in the memory 14 under control of the controller 13.

As mentioned before, the illustrated cellular phone 10 is operable to automatically transmit the personal data sequence of the user which is registered in the memory 14 and which may include the user's directory number and so on. In addition, the cellular phone 10 is also operable to automatically register the personal data sequence sent from the other party in the user's cellular phone 10.

To this end, the illustrated cellular phone 10 has the primary registration section of the memory 14 in which the user's personal data sequence has been previously registered. Under the circumstances, when the voice signal is received by the controller 13 from the microphone 16 through the voice detector 15 during a talk or conversation, the controller 13 puts the transmission data selection unit 25 into operation to make the transmitter/receiver 12 transmit the voice signal in the form of the transmission data sequence. This shows that a sequence of voice or speech data is sent from the transmitter/receiver 12 through the antenna 11 as the radio signal to the other party.

Herein, it is to be noted that a quiescent time inevitably takes place during talking or conversation as the pause period which is in the absence of any voice signal. When such a pause period is detected during talking or conversation, the voice detector 15 supplies the pause detection signal to the controller 13. Responsive to the pause detection signal, the processing unit 26 of the controller 13 puts the transmission data selection unit 25 into operation to read the personal data sequence of the user out of the memory 14 and to send the same to the antenna 11 through the transmitter/receiver 12.

On the other hand, when the voice detector 15 detects a change from the absence of the voice signal to the presence during the conversation, such a change is transmitted to the controller 13. On detecting the presence of the voice signal, the processing unit 26 of the controller 13 recognizes the presence of the voice signal and transmits the voice signal as the transmission data sequence to the transmitter/receiver 12 in cooperation with the transmission data selection unit 25.

Furthermore, the controller 13 is operable to detect the personal data sequence from the reception data sequence received through the antenna 11, by the use of the personal data detection unit 21 and to extract the same by the personal data extraction unit 22. Thereafter, the personal data comparison unit 23 compares the received personal data sequence with the registered data sequences stored in the memory 14, as mentioned before. When the received personal data sequence is not registered or is to be used to update the registered data sequence, the personal data registration unit 24 automatically registers or stores the received personal data sequence into the memory 14.

Referring to FIG. 3, illustration is made about an example of a personal data sequence registered in the cellular phone 10 shown in FIG. 1. In the illustrated example, the user exemplified in FIG. 3 is assumed to be given first through N-th directory numbers 1 to N together with first through N-th e-mail addresses. In addition, illustration is also made in FIG. 3 about a user's name ( ) written in Chinese characters and the corresponding Japanese phonetic alphabets, that is, kana ( ). Moreover, die illustrated personal data sequence also includes original designated melody data signaling each incoming call and original designated image data signaling each incoming call. The original designated melody data are for determining melodies which are concerned with the directory numbers and the e-mail addresses and which sound in response to the incoming calls. On the other hand, the original designated image data are for determining images which are concerned with the directory numbers and the e-mail addresses and which are displayed in response to the incoming calls. In any event, the above-enumerated personal data sequence of the user is previously stored in the memory 14 shown in FIG. 1.

Figures 4A, 4B:
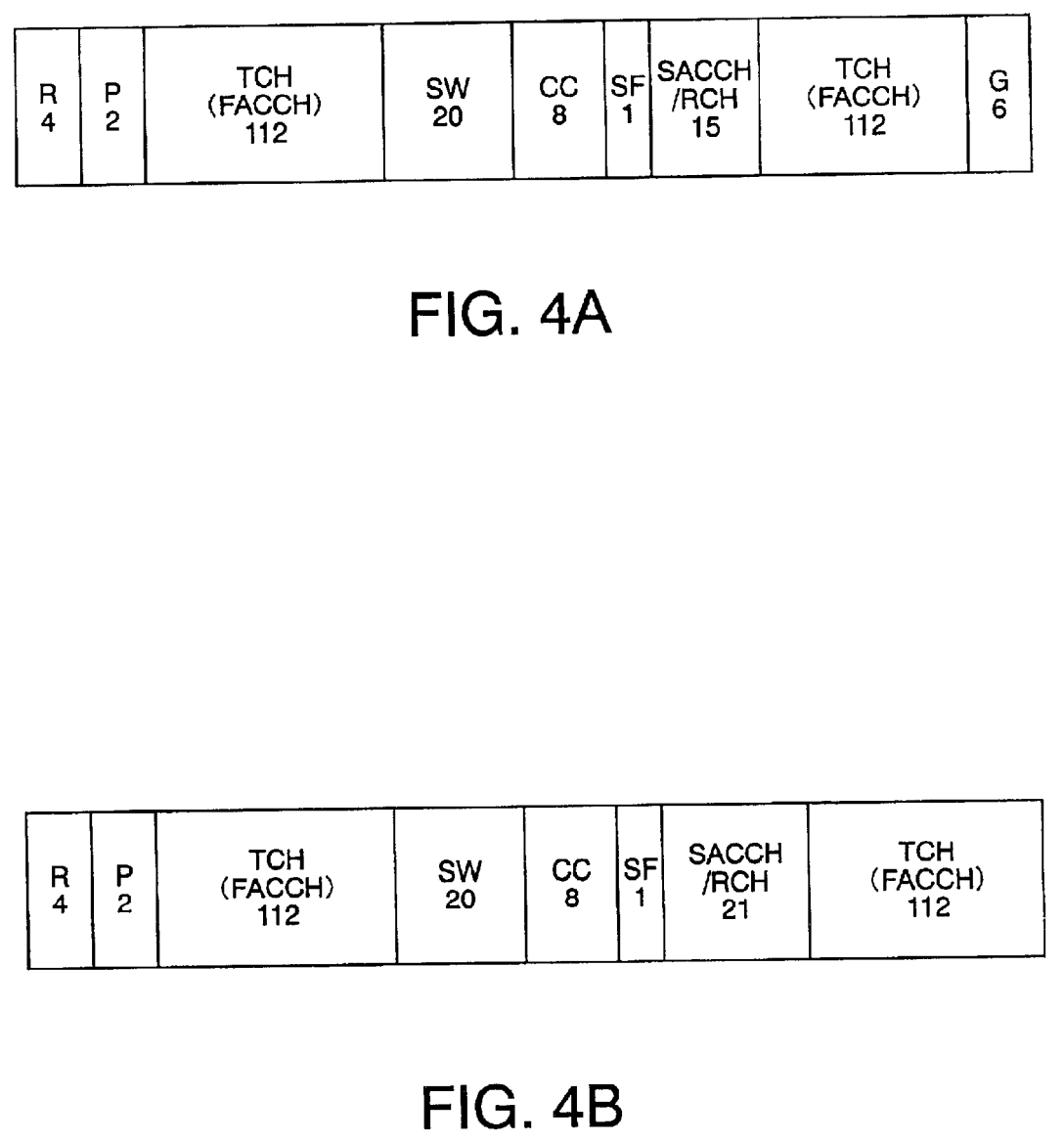

Referring to FIGS. 4A and 4B, description will be made about signal formats which are used in an upward link and a downward link, respectively. Specifically, the illustrated formats are determined in ARIB (Association of Radio Industries and Business) digital mobile telephone system standard RCRSTD-27 and are especially prescribed about a physical layer 1 in a radio section interface of the PDC (Personal Digital Cellular). During talking or conversation, data transmission and reception are made through the antenna 11 (FIG. 1) by using the signal formats shown in FIGS. 4A and 4B. Each of the signal formats illustrated in FIGS. 4A and 4B has a burst response guard time (R) of 4 bits, a preamble (P) of 2 bits, a traffic channel (TCH) field of 112 bits, a synchronization word (SW) field of 20 bits, a color cord (CC) field of 8 bits, and a still flag (SF) of 1 bit. In addition, the signal format for the upward link (FIG. 4A) is specified by a slow associated control channel (SACCH) field of 15 bit and a guard time (G) of 6 bits. On the other hand, the signal format illustrated in FIG. 4B is specified by the SACCH field of 21 bits. Furthermore, each of the SACCH field illustrated in FIGS. 4A and 4B may be replaced by a house keeping bit (RCH) field of 15 bits or 21 bits.

Herein, it is to be noted that each TCH field illustrated in FIGS. 4A and 4B may be used as a fast associated control channel (FACCH) field in absence of any transmission data sequence.

Taking this into consideration, a voice data sequence is located in the traffic channel (TCH) field during the talking. If the pause period is detected by the voice detector 15 (FIG. 1), no voice data sequence is present as the transmission data sequence so as to be located in the traffic channel (TCH) field. Under the circumstances, the transmission data selection unit 25 (FIG. 2) of the controller 13 is operated by the processing unit 26 to arrange the personal data sequence (FIG. 3) in the form of a fast associated control channel (FACCH) field of 112 bits. This shows the traffic channel (TCH) field of 112 bits is replaced by the FACCH field in the illustrated example.

Referring to FIG. 5, a message format of user information is illustrated which is defined for a call control function on a layer 3 of the radio section interface of the PDC and which complies with the ARIB digital mobile telephone system standard RCR STD-27. By arranging a data sequence in the FACCH field of the signal format of the physical channel illustrated in FIGS. 4A and 4B, a user information message is transmitted from each user terminal or device to a network and transmitted from the network to another user device, such as a cellular phone. As shown in FIG. 5, the message format has a protocol identifier field of 1 octet, a call number/additional service identifier field of 1 octet, a message species field of 1 octet, a user-user field of a variable length between 2 and 131 octets, and a more data field of 1 octet.

Under the circumstances, the personal data sequence illustrated in FIG. 3 is transmitted to an opposite user or the other party as user message information by dividing the personal data sequence and by arranging each divided data sequence into the FACCH. Responsive to the user message information, the personal data detection unit 21 of the controller 13 (FIG. 2) detects a difference between the TCH data sequence and the FACCH data sequence. On detection of the FACCH data sequence, the personal data extraction unit 22 extracts the divided personal data sequence from the user message information.

Figure 6:
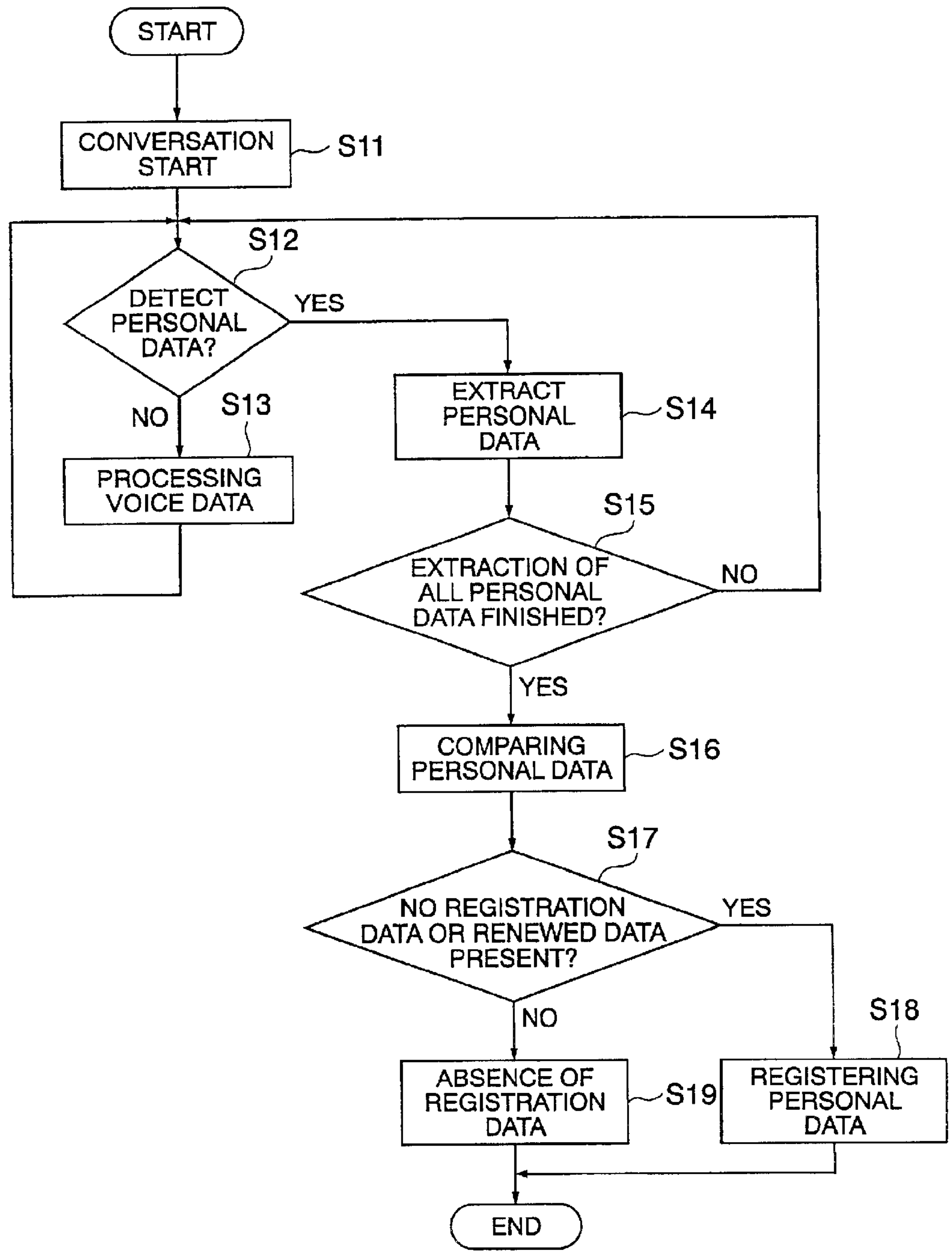
FIG. 6 shows a flow chart for use in describing a procedure of registering a personal data sequence from a reception data sequence received by the cellular phone illustrated in FIG. 1.

Referring to FIG. 6, description will be made about operation of registering a personal data sequence from a reception data sequence in the cellular phone illustrated in FIG. 1. At first, when a conversation is started (step S11) to be rendered into a conversation state, the personal data detection unit 21 (FIG. 2) of the controller 13 is operated to judge whether or not the personal data sequence is included in the reception data sequence (step S12). When the personal data sequence is not included, the step S12 is followed by a step S13 at which a voice data sequence is processed as a usual voice data sequence. On the other hand, when the personal data sequence is detected from the reception data sequence by the personal data detection unit 21 of the controller 13, the step S12 is followed by a step S14 at which the personal data extraction unit 22 of the controller 13 extracts the personal data sequence from the reception data sequence. Until the personal data extraction unit 22 finishes extraction of the personal data sequence, the personal data detection unit 21 detects the personal data sequence (step S15).

When the personal data sequence is completely extracted by the personal data extraction unit 22, the step S15 proceeds to a step S16 at which the personal data comparison unit 23 compares the extracted personal data sequence with the registered personal data sequence stored in the memory 14. In this event, the personal data comparison unit 23 determines whether or not the extracted or received personal data sequence is registered in the memory 14 (step S17). In addition, the personal data comparison unit 23 also judges whether or not the received personal data sequence includes updated data. If no registration data or updated data are included in the personal data comparison unit 23, the step S17 is followed by a step 18 at which the registration data and the updated data in the received personal data sequence are registered in the memory 14.

If the received personal data sequence is already registered in the memory 14, the step S18 is succeeded by a step S19 at which no data are registered in the memory 14.

Figure 7:
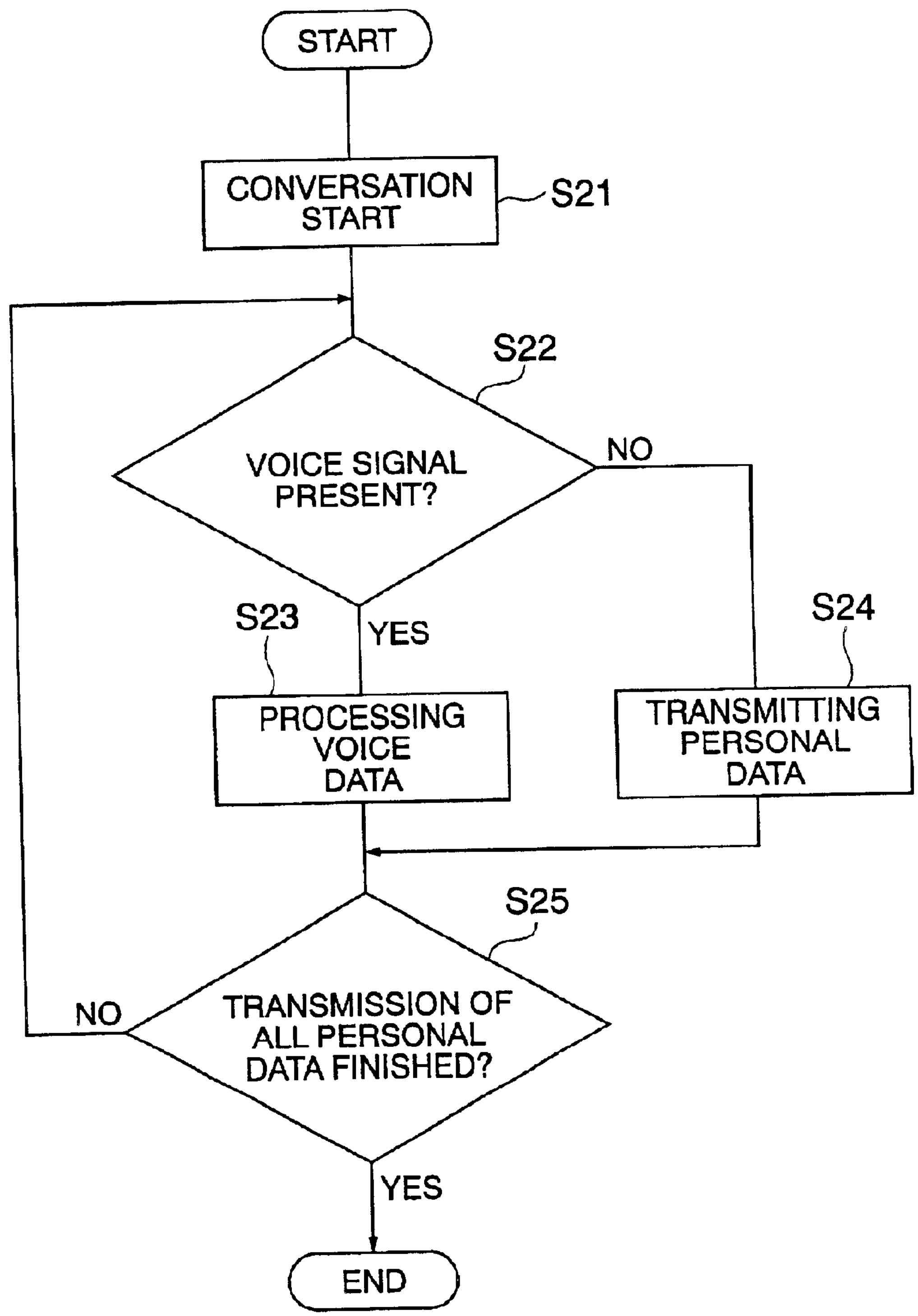
FIG. 7 shows a flow chart for use in describing a procedure of transmitting a personal data sequence from the cellular phone illustrated in FIG. 1.

Referring to FIG. 7, description will be made about transmission procedure executed in the cellular phone according to this invention. When a conversation is started at a step S21, the voice detector 15 (FIG. 1) is operated at a step S22 to judge whether or not the voice signal is present, namely, whether there is a quiescent time. If any voice signal is present, the step S22 is followed by a step S23 of processing the voice data sequence in a usual manner. Specifically, the voice signal is transmitted as the voice data sequence through the transmission data selection unit 25 of the controller 14 to the transmitter/receiver 12. On the other hand, if no voice signal is detected at the step S22, a step S24 follows the step S 22 to transmit the personal data sequence read out of the memory 14 through the transmission data selection unit 25 to the transmitter/receiver 12. The step S24 is repeated until the personal data sequence is completely transmitted. When transmission of a whole personal data sequence is detected at a step S25, processing is finished at the transmission data selection unit 25.

While this invention has thus far been described in conjunction with a preferred embodiment thereof, it will be readily possible for those skilled in the art to put this invention into practice in various other manners. For example, the personal data sequence may be transmitted during the conversation through the SACCH instead of the FACCH. According to this transmission, the personal data sequence always can be transmitted by the controller 13 during the conversation, regardless of the presence or absence of the voice signal sent from the voice detector 15. As a result, the voice and the personal data sequences may not be distinguished from each other on a receiving side, although a long time is required to transmit the personal data sequence through the SACCH as compared with transmitting through the FACCH. In addition, a personal digital assistance (PDA) device may be used in the cellular phone, although description has been restricted to the cellular phone.

From the above, it is readily understood that the personal data, such as telephone directory numbers, e-mail addresses, assigned to the opposite party can be automatically registered by receiving it only one time. Such an operation can be executed by detecting the pause period and arranging the personal data during the pause period on the transmission side and by registering the personal data in the memory by extracting the personal data from the reception data. Moreover, all of the data, such as melody data, image data, directory numbers, can be transmitted and received irrespective of the species of the data. In any event, such data can be automatically registered in the memory and transmitted to the other party during the pause period.

What is claimed is:

1. A portable communication device for use in carrying out communication with another party through a radio channel, comprising:

- a receiver unit for receiving a reception communication signal together with an identification data signal from the other party identifying the other party, said identification data signal indicating an e-mail address and being arranged within a pause period of the reception communication data signal, the reception communication data signal being received from the other party over a direct communication channel established between the portable communication device and the other party; and
- a first registration section for automatically registering the identification data signal by distinguishing the identification data signal from the reception communication data signal.

2. A portable communication device as claimed in claim 1, further comprising:

- a first control section for controlling the receiver unit and the first registration section to distinguish between the reception communication data signal and the identification data signal to selectively store only the identification data signal in the first registration section.

3. A portable communication device as claimed in claim 2, wherein the identification data signal is arranged within a pause period of the reception communication data signal;

the first control section comprising:

a detection unit for detecting the identification data signal by monitoring the pause period of the reception communication data signal; and a delivery unit for delivering the identification data signal detected by the detection unit to store the same into the first registration section.

4. A portable communication device as claimed in claim 1, further comprising:

a second registration section for registering a user's identification data signal identifying the user; and a transmitter unit for automatically transmitting the user's data signal.

5. A portable communication device as claimed in claim 4, further comprising:

a voice signal detection unit for detecting a voice signal to send the voice signal detected to the transmitter unit.

6. A portable communication device as claimed in claim 5, wherein the voice signal detection unit comprises:

a pause detecting section for detecting a pause period from the voice signal to produce a pause detection signal representative of the pause period when the voice signal is absent during the communication;

the first control section further comprising:

a transmission data selection unit for arranging the user's identification data signal instead of the voice signal when the pause period is detected.

7. A portable communication device as claimed in claim 1, which is operable as a portable digital assistance (PDA) device.

8. A portable communication device as claimed in claim 1, which is operable as a cellular phone.

9. A portable communication device as claimed in claim 8, further comprising:

comparing means for comparing the caller's identification data signal with registered personal identification data signals in the first control section, to detect whether or not the identification data signal is coincident with either one of the registered personal identification data signals; and registering means for updating the registered personal identification data signals by delivering the identification data signal to the first registration section only when the identification data signal is incoincident with each of the registered personal identification data signals.

10. A portable communication device as claimed in claim 9, wherein the identification data signal includes both a directory number and e-mail address all of which are assigned to the other party.

11. A portable communication device as claimed in claim 9, further comprising:

receiving means for receiving a user's voice signal to detect a pause period within the user's voice signal and to produce a pause detection signal representative of the pause period;

registering means for registering a user's identification data signal; and processing means for processing the users s voice signal and the pause detecting signal to insert the user's identification data signal into the user's voice signal within the pause detection signal.

12. A portable communication device as claimed in claim 11, wherein each of the identification data signal and the user's identification data signals is separately arranged in place of the voice signal within a traffic channel field.

* * * * *